Patented Feb. 23, 1926.

1,574,233

UNITED STATES PATENT OFFICE.

NORMAN HENRY CHRISTENSEN, OF WINDSOR, VICTORIA, AUSTRALIA.

MANUFACTURE OF POWDERED MILK.

No Drawing.   Application filed April 23, 1925.   Serial No. 25,435.

*To all whom it may concern:*

Be it known that I, NORMAN HENRY CHRISTENSEN, a subject of the King of Great Britain, residing at Windsor, in the State of Victoria, Commonwealth of Australia, have invented new and useful Improvements in the Manufacture of Powdered Milk, of which the following is a specification.

This invention relates to improvements in the manufacture of powdered or dried milk and similar milk products, and particularly to that process of manufacture wherein the milk is desiccated by being passed in a thin film or layer over a heated roller or rollers. This process of manufacture, although one of the cheapest and most efficient processes now in use, has the great disadvantage that the milk powder produced is not wholly soluble in water and is therefore entirely unsuitable for many purposes. The cause of this insolubility is that during the desiccation of the milk by the heated rollers, the casein principle in the milk is affected by the high temperature and becomes hardened and insoluble.

The object of the present invention is to provide a process of treating milk prior to desiccation whereby the powdered milk product produced will be completely soluble in water.

The invention broadly consists in initially treating the milk so as to remove or render chemically inert a portion of its calcium content. The improved process is based upon the fact that, when a small portion of the calcium content of the milk is removed or rendered chemically inert in respect to the milk, the casein is then more easily acted upon by small quantities of added compounds, such as sodium citrate and sodium carbonate or other alkali, and is thus enabled to withstand the high temperature of the heated rollers without being affected or becoming hardened and insoluble.

In one preferred method of carrying the invention into effect, a small quantity of sodium oxalate is first added to the milk and the milk then stirred and allowed to stand for a period of about five minutes. The quantity of sodium oxalate added will vary according to the quality of the milk being treated, the time of the year, and also the climatic conditions, but I have found that for an ordinary sample of milk, a quantity of up to twelve ounces of sodium oxalate per one thousand pounds of milk is very suitable. The desirable quantity of sodium oxalate to be added should, however, be the minimum quantity which will produce the required result.

The sodium oxalate decomposes portion of the calcium content of the milk and forms calcium oxalate which, being an insoluble compound, is immediately precipitated or thrown down. The treated milk is then passed through centrifugal separators or cleaners, filters or like apparatus, wherein the precipitated calcium oxalate is removed.

Small quantities of sodium citrate and also sodium carbonate or other suitable alkali are then added to the treated milk. The quantity of sodium citrate added may vary up to six ounces per one thousand pounds of milk, while the quantity of sodium carbonate or alkali may vary up to ten ounces per one thousand pounds of milk.

The milk after being allowed to stand for a short period is then desiccated in the usual manner by being passed in a thin film or layer over a heated roller or rollers. To ensure rapid and thorough desiccation of the treated milk, the milk may be first condensed in vacuum boilers prior to being passed over the heated rollers.

If desired, the precipitated calcium oxalate need not necessarily be removed from the milk, but it can be allowed to remain in the final dried product, as when the calcium salts are in this state, they are chemically inert and insoluble, and thus have no effect upon the casein while the milk is being desiccated.

In the carrying out of the improved process, it is not necessary that all of the milk to be dried be treated with the sodium oxalate, but, for convenience, the milk can be divided into portions and the sodium oxalate added to only one of such portions. This portion after filtering is then again returned to the other untreated portions and is mixed therewith. The treated portion of the milk should, however, never be less than at least one third of the total bulk of milk to be dried.

In the treatment of full cream milk for the production of whole milk powder, it is preferable to divide the bulk of milk into portions in the manner previously described, and to then add the sodium oxalate to only one of said portions. This portion of the milk is then passed through a separator which removes the precipitated calcium oxalate and separates the cream from the milk. The separated cream is again returned to the milk and the treated portion then mixed with the other untreated portions.

It is essential in the manufacture of dried milk that the fresh milk should be placed under factory control as early as possible, in order to prevent wastage through the milk becoming sour and unusable. One effective method of accomplishng this purpose is to precondense the milk immediately it is received at the factory, but when the milk is dried by ordinary desiccating processes, this method is unsuitable as the resultant dried product is rendered completely insoluble. With the present process, however, the fact that the milk is pre-condensed prior to desiccation and treatment does not in any way affect the solubility of the dried powder. For full cream milk, I find that a degree of concentration of twenty-three degrees Quevenne lactometer reading at sixty degrees Fahrenheit (when diluted to the ratio of one part of concentrate to three parts of water) gives highly satisfactory results with the improved process. For skim milk, however, it is desirable to concentrate the milk to thirty-three degrees Quevenne lactometer reading at sixty degrees Fahrenheit (when diluted to the ratio of one part of concentrate to three parts of water). The above degrees of concentration must, however, be regarded merely as examples, as local conditions and also the quality of the milk have very much effect.

In the production of skim milk powder according to the improved process, it is found that the quality of the final product is greatly improved if the milk be skimmed to .3% butter fat. In the treatment of one thousand pounds of skim milk, the following quantities have been found to be very satisfactory—sodium oxalate ten ounces, sodium carbonate eight ounces, sodium citrate six ounces.

These quantities can, however, be varied as required, the desirable quantities being obtained by watching the color of the product from the heated rollers and also the color of the solution obtained by dissolving the dried powder in water. If the milk powder is very soluble and the color of the solution is too yellow, smaller quantities should be used, the aim being to use as little as possible to bring about the desired result.

It is to be understood that the invention is not limited solely to the use of sodium oxalate for the precipitation of the calcium content of the milk, but that other suitable oxalates may be used, or in fact any other salt which will form an insoluble and separable compound with the calcium content of the milk. Furthermore, it is also to be understood that the invention is not limited to the process of removing the calcium content by precipitation as herein described, but that any other process may be employed which will result in its satisfactory removal.

The dried or powdered milk product obtained by the improved process is completely soluble in water at temperatures ranging from one hundred and five degrees Fahrenheit to boiling point, and when in solution it forms a very satisfactory and wholesome substitute for fresh milk both for household and manufacturing purposes. Furthermore, it is also very readily digestible as the casein is in such condition that it does not form so hard a curd in the stomach as does fresh milk.

What I do claim is:—

1. A process of treating milk in the manufacture of dried milk which consists in removing the calcium content of the milk, prior to desiccation.

2. A process of treating milk in the manufacture of dried milk which consists in rendering the calcium content chemically inert relative to the milk, prior to desiccation.

3. A process of treating milk in the manufacture of dried milk which consists in removing a portion of the calcium content of the milk, prior to desiccation.

4. A process of treating milk in the manufacture of dried milk which consists in rendering a portion of the calcium content chemically inert relative to the milk prior to desiccation.

5. A process of treating milk in the manufacture of dried milk which consists in precipitating a portion of the calcium content of the milk prior to desiccation.

6. A process of treating milk in the manufacture of dried milk which consists in precipitating a portion of the calcium content of the milk, and then treating the milk to remove the precipitated calcium.

7. A process of treating milk in the manufacture of dried milk which consists in adding a quantity of a soluble oxalate to the milk prior to desiccation to precipitate a portion of the calcium content.

8. A process of treating milk in the manufacture of dried milk which consists in adding a quantity of sodium oxalate to the milk prior to desiccation to precipitate a portion of the calcium content.

9. A process of treating milk in the manufacture of dried milk which consists in adding a quantity of sodium oxalate to the milk prior to desiccation to precipitate a portion of the calcium content, and then treating the milk to remove the precipitated calcium.

10. A process of treating milk in the manufacture of dried milk which consists in adding a quantity of sodium oxalate to the milk prior to desiccation to precipitate a portion of the calcium content, treating the milk to remove the precipitated calcium and then adding quantities of sodium citrate and sodium carbonate or alkali.

11. A process of treating milk in the manufacture of dried milk which consists in dividing the milk into portions, adding a quantity of sodium oxalate to one portion to precipitate a portion of the calcium content, treating that portion to remove the precipitated calcium and then returning the treated portion to the untreated portions.

12. A process of manufacturing dried milk which consists in first adding a quantity of sodium oxalate to milk to precipitate a portion of the calcium content, treating the milk to remove the precipitated calcium, adding quantities of sodium citrate and an alkali to the milk, and then desiccating the milk by passing it in a thin film or layer over a heated roller.

In testimony whereof I affix my signature.

NORMAN HENRY CHRISTENSEN.